May 17, 1955
W. BRADLEY
2,708,456
TENSION CONTROLLING MEANS
Filed July 25, 1951
2 Sheets-Sheet 1
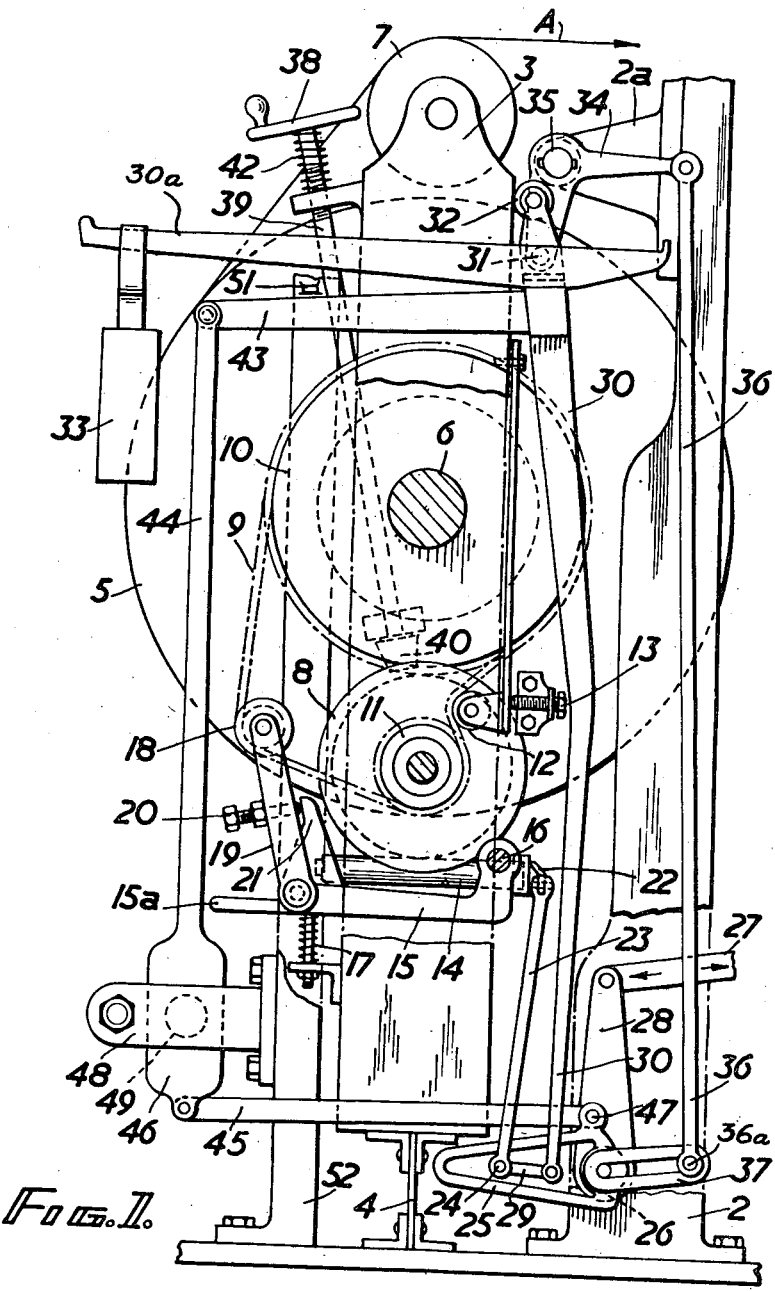
Fig. I.
INVENTOR:
William Bradley,
By Pierce, Scheffler & Parker.
ATTORNEYS.

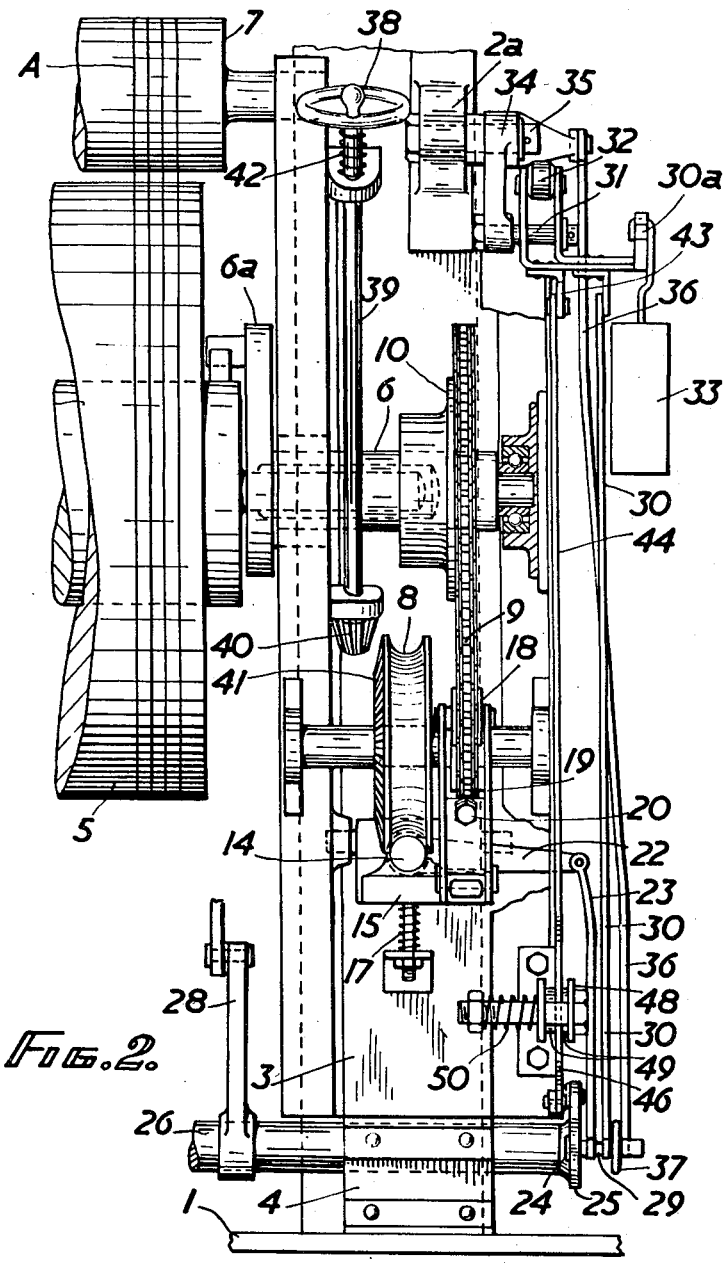

United States Patent Office 2,708,456
Patented May 17, 1955

2,708,456

TENSION CONTROLLING MEANS

William Bradley, Addingham, near Ilkley, England

Application July 25, 1951, Serial No. 238,542

12 Claims. (Cl. 139—109)

This invention relates to tension control means in, or for use in connection with, apparatus in which a flexible length of material, previously wound on or around a supply drum, spool or like rotatable carrier, is withdrawn from the carrier by the application of tension to the material.

The object of the invention is to provide means for regulating the tension on the material during withdrawal from the carrier, in order to maintain such tension at any desired stress, or within predetermined stress limits, irrespective of variations in the force acting to withdraw the material and/or of variations in the effective radius of the mass of material wound on or around the carrier.

The invention may be utilized during the handling of any flexible material, such as is commonly carried in bulk wound on a rotatable carrier. It may also be used where such materials, during a manufacturing process, are wound around a drum or carrier for the purpose of controlling their movement from one point to another. Examples of such materials are textiles in the form of threads, bands, fibres, sheets or the like; flexible metal or metallic material in similar form, such as sheets, strips, bands, wires or the like; plastic materials and paper, but the invention is not limited to use with these specific materials.

Where it is desired to control the tension on the material during withdrawal, it is customary to apply a braking force to the carrier and to adjust the braking force relative to the withdrawing force to produce the required tension.

The invention therefore is particularly concerned with tension control means for apparatus of the type wherein braking force is aplied to a rotatable carrier or element to control the withdrawal of material by external means imparting tension thereto.

According to the present invention, there is provided, in or for apparatus of the type referred to, tension control means comprising a brake drum or the like mechanically coupled to the said rotatable element so as to rotate at a speed directly proportional therewith, at least one brake member engaging the said drum or the like under the influence of loading means adapted to provide static friction with a braking effect sufficient to hold said rotatable element normally against rotation, and means controlled by variations in tension on the material for effecting movement of said brake member or members in relation to the brake drum or the like without affecting the applied braking load so that, when the tension rises above a set limit, conditions of static friction are broken down and replaced by conditions of kinetic friction whereby controlled rotation of the rotatable element is permitted said movement of the brake member or members varying according to variations in tension so as to maintain the average tension on the material substantially constant.

In apparatus of the type above-mentioned, the applied torque on the carrier is a component of two factors: first, the force applied to withdraw the material and, secondly, the radial distance between the point where the material leaves the circumference of the mass tangentially, and the axis of rotation of the carrrier.

To maintain a predetermined tension of the material, the braking mechanism of the carrier must be capable of compensating automatically for any changes in either or both components of the applied torque. Such compensation must be so rapid as to be virtually instantaneous in that it must take effect immediately when there is any tendency for the tension to vary, and before that tension has departed appreciably from the desired average tension.

A particular example of a problem which this invention aims to solve, is the regulation of the tension in the warp threads of a loom, where these threads are carried on a rotatable carrier known as a beam, and drawn off by tension during the weaving process, the woven cloth being wound onto another roller or drum, which is mechanically driven at a predetermined speed.

The tension in the threads is induced by a brake mechanism acting against the winding-on force to restrain rotation of the beam, but several factors affect this tension during operation. Assuming a given braking force on the beam and a given winding-on force, the tension in the warp threads will vary according to the diameter of the mass of threads on the beam. These threads are drawn off at a tangent to the circumference of the mass; therefore the greater the radius of the mass, the less tension will be required to rotate the beam against the given braking force. In addition to this variation, there is another major cyclic variation affecting warp thread tension caused by the opening and closing of the shed during weaving, and also variations caused by the beating-up mechanism.

As, in most textiles, the breaking stress of the warp threads is substantially constant, it can be seen that if the tension in them is normally maintained near their breaking point, some mechanism must be provided to counteract any tendency towards tension variations which might otherwise exceed that breaking stress, and the mechanism must be delicately responsive to the factors causing such variations, so as to compensate for them automatically and virtually instantaneously.

Mechanisms have been developed and are well-known for counteracting major cyclic variations such as shedding, but there still remains the problem of compensating automatically for variations due to the gradual change in diameter of the mass of threads on the beam.

The present invention includes, in or fof apparatus, such as a loom in which thread or other material is withdrawn from a drum, beam or other rotatable carrier or supply element and exerts a torque on said element which varies with the effective radius of the applied tension, tension control means comprising a brake drum or the like, a driving connection from said supply element to said brake drum or the like whereby the latter is caused to rotate at a speed directly proportional to that of the said supply element, at least one brake member engaging said brake drum or the like under an initially applied load sufficient to prevent rotation of said element under conditions of static friction between the contacting brake surfaces, means for automatically adjusting the applied load on the brake member or members to compensate for variations in the effective radius of the resultant applied torque on the said supply element so as to maintain a predetermined initial static braking effect above a predetermined minimum, and means controlled according to the tension on the material so that, on increase in tension above a set limit, intermittent movement of the said brake member or members in relation to the brake drum or the like is effected in such manner that, while the applied braking load remains unaltered, static friction in the brake is broken down during such relative movement and replaced by kinetic friction so that, under the influence of the torque acting on said rotatable element, the latter is permitted to rotate in steps of an amplitude determined by the amplitude and/or speed and/or duration of the movement imparted to the said brake member or members.

In the application of the invention to a loom, the brake member or members is or are operated so that under conditions of kinetic friction the warp beam is permitted to rotate to a comparatively small degree, preferably twice per pick, and under conditions of static friction is caused to stop between each movement. The stops are definitely positive and occur alternately at or near the beat-up and back-centre positions of the sley. The degree of each movement is determined by the state of the warp tension at any moment and is automatically increased if the tension rises and decreased if the tension falls.

Preferably the means referred to for adjusting the applied load on the brake member or members is provided in, or in association with, the driving connection between the said rotatable element and the brake drum or the like, the arrangement being such that the braking load is regulated according to the torque exerted on the said rotatable element, for instance, by the provision of a jockey sprocket or pulley engaging a driving chain and acting on a movably mounted carrier for the brake member or members to vary the applied braking load.

The brake member or members may be movable in relation to the brake drum or the like in a direction transverse to the plane or direction of rotation thereof and may be subject to oscillatory movement, or to intermittent or pulsating movement in one direction, under the control of means sensitive to variations in tension on the material.

The movement of the brake member or members in relation to the brake drum or the like may be controlled by a feeler lever mechanism operated by movement of a mounting for the said rotatable element.

The means for effecting movement of the brake member or members in accordance with variations in tension may include adjustable loading means, such as a weight, arranged so that the tension effected by the control means may be adjusted and maintained.

In a preferred embodiment, the brake drum or the like is formed with a circumferential groove, and a brake member in the form of a tangentially arranged friction bar mounted for rotation about its axis is arranged to coact with said groove.

The invention is hereinafter described, by way of example, with reference to the accompanying diagrammatic drawings, in which:

Fig. 1 is a view in side elevation illustrating an embodiment of the improved tension control means according to the invention; and Fig. 2 is a part sectional end elevation corresponding to Fig. 1.

In carrying the invention into effect according to one embodiment, and in the particular application of the invention to a loom let-off or warp control, the improved tension control means is provided in the form of a unit which may be secured to a loom by brackets or stays. The unit comprises a base 1 attached to an upwardly extending fixed frame member 2 which may be part of the loom, a sub-frame 3 pivotally supported on a flexible blade 4 and carrying the rotatable element, i. e. the beam 5, carried by a tubular shaft 6 having a driving crank 6a, the warp A being led from the beam over a back roller 7.

The tension control means comprises a circumferentially grooved brake drum 8 or the like which is mechanically connected to the shaft 6, so as to rotate at a speed directly proportional to that of the shaft 6, as by means of a chain 9 engaging a chain wheel 10 on the shaft 6 and a sprocket 11 on a shaft carrying the grooved brake drum 8. A pulley 12 provided with adjusting means 13 is provided for taking up slack in the chain. A brake member 14 in the form of a friction bar is rotatably mounted in a carrier 15 pivoted at 16, the friction bar being tangentially arranged with respect to the grooved drum 8. The carrier 15 is loaded by means of an adjustable spring 17 for applying a predetermined initial braking load. It should be understood that the initial pre-loading of brake member 14 attained by the spring 17 is merely to obtain a condition of static friction until the tension-controlling mechanism is in operation whereupon the loading effect is taken over by the unit responsive to deflection of the chain 9 so that the brake loading is made variable automatically as the diameter of the material roll 5 decreases as will now be more fully explained. For the purpose of regulating the loading on the brake in accordance with variations in the diameter of the material on the beam 5, a jockey sprocket 18 is arranged to engage the chain 9, said jockey sprocket being mounted on a lever 19 pivotally connected to the carrier 15 and provided with adjustment means 20 engaging a stop 21 on the carrier 15, the arrangement being such that the loading of the brake is regulated according to the tension in the chain 9 which, in turn, depends on the torque exerted on the shaft 6 resulting from the tension in the warp A and the radius of the warp on the beam 5 from the axis thereof at any time. Thus, as the diameter of the warp on the beam decreases, the loading on the brake will be decreased proportionately.

The initial pre-loading of the brake is such that, under conditions of static friction between the friction bar 14 and the brake drum 8, the braking force is maintained above a predetermined minimum sufficient to hold the beam 5 against rotation. If the friction bar is rotated so as to move relatively to the brake drum 8, in a direction transverse to the plane thereof so as not to alter the braking load, conditions of static friction will be broken down and replaced by kinetic friction which will reduce the braking effect and thereby permit rotation of the beam 5. In order to compensate for variations in the tension in the warp A, means controlled by such variations are provided for effecting movement of the friction bar 14 in relation to the brake drum 8 in steps, the speed and/or amplitude and/or duration of which vary in accordance wtih variations in tension in the warp. For this purpose, the friction bar 14 is provided at one end with a lever arm 22 fixed thereto to extend laterally therefrom, and at its outer end this lever arm 22 is connected by suitable universal coupling to a link 23 which, at its lower end, is provided with a pin 24 extending within an elongated opening in a lever 25 of triangular shape, as shown, the pin 24 engaging the internal triangular formation of the lever 25 with lost motion. The lever 25 is mounted on a counter-shaft 26 which is oscillated at a suitable frequency derived from a suitable part of the loom, such as the sley sword, by a connecting rod 27 pivoted to an arm 28 fixed on the counter-shaft 26, and thus intermittent oscillatory movements will be imparted to the friction bar 14, the amplitude of such movements depending on the distance of the pin 24 from the axis of the counter-shaft 26.

Variation in the amplitude of the movements imparted to the friction bar 14 dependent on variations in tension in the warp A is obtained by connecting the lower end of the link 23 by means of a rod 29 to the lower end of a feeler lever 30 which is pivotally mounted at 31 and is provided with a roller 32 which contacts with an adjacent face of the pivotal frame 3. The lever 30 is provided with an arm 30a which carries a weight 33 adjustable along the arm 30a. The tension to be maintained in the warp is controlled by the positioning and value of the weight 33 on the arm 30a.

If the load on the arm 30a acting through the roller 32 against the pivotal frame 3 fails to balance the opposing force exerted on the frame 3 by the tension in the warp A, the lower end of the feeler lever 30 will be disposed in a position in which the pin 24 on the link 23 connected to the lever 30 by the rod 29 is disposed at such distance from the axis of the counter-shaft 26 that the lost motion between the pin 24 and the internal triangular formation of the lever 25 is such that no motion is imparted to the friction bar 14. Under operating conditions, when tension in the warp A rises the pivotally mounted frame 3 will move towards the fixed frame 2 and by exerting pressure on the roller 32 will cause the feeler lever 30 to turn in a clockwise direction so that the pin 24 will be displaced towards the free end of the lever 25 and, according to the extent of such displacement, the pin 24 will be engaged by the lever 25 for transmitting oscillatory movements to the friction bar 14, the amplitude of such movements depending on the distance of the pin 24 from the axis of the counter-shaft 26. Thus, the greater the increase in tension in the warp A, the greater will be the amplitude of the movements of the friction bar 14 and vice versa. As before mentioned, the movement of the friction bar 14 in relation to the brake drum 8 breaks down the static friction and the consequent reduction in the frictional effect permits controlled release of the beam 5 in steps of small amount which take place twice per pick with a definite stop between each movement, the stops being definitely positive and occurring alternately at or near the beat-up and back-centre positions of the sley. The extent of each movement is determined by the warp tension at the moment, being automatically increased if the tension rises and decreased if the tension falls.

In order to compensate for major cyclical variations in warp tension, the feeler lever assembly is mounted as follows. The pivot 31 of the lever 30 is carried by a bell crank lever 34, pivoted at 35 to a bracket 2a mounted on the frame member 2. The horizontally extending arm of the lever 34 is connected by means of a rod 36 to a slotted lever 37 fixedly mounted on the counter-shaft 26, the connection of the rod 36 with the lever 37 being adjustable as regards its distance from the axis of the counter-shaft 26 by making the pin 36a adjustable in the lever slot. Thus the effective stroke can be varied at will. This method of mounting the feeler lever assembly ensures that the to-and-fro movement of the pivotal frame 3 in synchronism with the loom, which compensates for major cyclical variations in tension, will not affect the pressure exerted by the frame 3 on the roller 32 under the influence of the tension in the warp A, and thus will not interfere with the automatic maintenance of constant average tension previously described.

In order to counteract any tendency to erratic operation of the feeler lever 30, this lever 30 is provided with an arm 43, which has its outer end pivotally connected to a drop rod 44, the lower end of which is connected by a link 45 to a lug 47 on the upper part of the lever 25. The drop rod 44 is provided, at its lower end, with a damper plate 46 disposed between fixed plates 48 with the inter-position of friction pads 49 loaded by an adjustable spring 50. This damper mechanism also serves to prevent any sustained reactionary or persistent strain on the warp which would result from the weight 33 on the lever 30a, when the loom is standing. When the loom is standing, the friction pads effectively prevent movement of the drop rod 44 and thus prevent the weight 33 from imposing pressure on the sub-frame 3 through roller 32 and strain on the warp. The damper action is only released when operated through lever 42 which breaks down the static friction between pads and rod.

Movement of the pivotal frame 3 in an anti-clockwise direction is limited by means of a stop 51 on a fixed frame part 52. An extension 15a on the carrier 15 may be provided for effecting manual release of the brake as required, while, for effecting rotation of the beam 5 for initially setting or adjusting the warp A, a hand wheel 38 is mounted on a shaft 39 having at its lower end a bevel pinion 40 which, by axial movement of the shaft 39 against the action of a spring 42, may be engaged with a bevel wheel 41 associated with the brake drum 8.

The purpose of the variable initial pre-loading of the brake under the influence of the jockey sprocket 18 is to keep the initial static friction of the brake within a suitable range within which the kinetic braking control is fully effective for maintaining a predetermined tension.

It will be understood that the invention is not limited to the particular embodiment hereinbefore described. For example, in its application to machines other than looms, such as before referred to, the rotatable element with which the tension control means is associated may comprise a supply drum or spool or a roller around which material is looped in passage from one point to another, or in which material is held in frictional contact by means such as a nip roller, and in such latter arrangements there is no necessity for variable pre-loading of the brake for any given tension. Furthermore, the tension control means may be associated with and operated by movements of a mounting for a take-up spool or a jockey pulley over which the material passes, or by electrical, hydraulic or other sensitive feeler means.

Variable pre-loading of the brake according to variations in the diameter of material on the beam or other rotatable element may be accomplished in any other suitable manner. Furthermore, the brake may be of any other suitable construction having a brake member or members coacting with a friction drum or the like and movable in relation thereto in such manner as to have no influence on the applied braking load. Furthermore, instead of operating the friction bar with an oscillatory movement, said bar may be moved in steps in one direction, for example, by a ratchet wheel and single or double-acting pawls. Two or more units controlling warps under various tensions may be employed in combination.

What I claim is:

1. Tension control means for apparatus wherein material is withdrawn from a roll to apply torque thereto comprising, a rotatable carrier for the material roll, a pivoted mounting supporting the rotatable carrier and a guide roller over which the material passes from the carrier, said carrier being capable of movement about the fixed pivot of the mounting from a position of equilibrium caused by the balance of forces applied in one direction by the material tension and in the other direction by a deflection loading of the carrier, a rotary brake element on the mounting, a deflectable mechanical driving connection between the carrier and said brake element for applying torque to said brake element, a movable brake member on the mounting engaging the rotary brake element under the influence of loading means adapted to provide a condition of static friction between the braking surfaces, said loading means being controlled by deflection of the said mechanical driving connection to produce a resultant force adapted to direct any required braking force by the brake member on the rotary brake element exactly proportional to the torque imposed on the carrier by the material tension to allow automatic variation of the braking load, operating means for causing movement of the brake member to break down static friction and thus allow rotation of the carrier, and feeler means responsive to any variation in material tension, said feeler means being associated with the brake member operating means to control the amplitude of operative movement imparted to said member and thus the material tension without affecting the applied braking force on the rotary brake element so that when the material tension rises above a set limit, conditions of static friction between the brake member and brake element are broken down and replaced by conditions of kinetic friction, whereby controlled rotation of the carrier is permitted, said movement of the brake member varying according to variations in tension so as to maintain the average tension on the material substantially constant.

2. Tension control means according to claim 1, wherein the mechanical driving connection between carrier and brake element capable of deflection for adjusting the applied load on the brake member comprises a jockey element engaging a driving chain and acting on said movably mounted brake member to vary the applied braking load.

3. Tension control means according to claim 1, wherein the brake member is movable in relation to the rotary brake element in a direction transverse to the direction of rotation thereof.

4. Tension control means according to claim 1, wherein the brake member is carried by a pivoted mounting to be subject to oscillatory movement under the control of said loading means associated with the deflectable driving connection to be sensitive to variations in tension on the material.

5. Tension control means according to claim 1, wherein the brake member is subject to intermittent movement in one direction under the control of said feeler means sensitive to variations in tension on the material.

6. Tension control means according to claim 1, wherein said feeler means which controls the movement of the brake member in relation to the rotary brake element includes a feeler lever mechanism operated by pivotal movement of the mounting for the said rotatable carrier.

7. Tension control means ccording to claim 1, wherein the feeler means for controlling the brake member operating means effecting movement of the brake member in accordance with variations in the material tension includes adjustable loading means, arranged so that the material tension effected by the control means may be adjusted and maintained.

8. Tension control means according to claim 1, wherein the rotary brake element is formed with a circumferential groove, and a brake member in the form of a tangentially arranged friction bar mounted for rotation about its axis is arranged to coact with said groove.

9. Tension control means for material passing from a roll comprising, a rotatable carrier for the roll, a mounting for said carrier adapted to have movement about a pivot, adjustable loading means for balancing the carrier and mounting in equilibrium against the pulling force of the material, a rotary brake element on the mounting and connected to the carrier by mechanical driving means capable of deflection according to the torque imposed on the carrier by the material, a rotatable brake member on the mounting, said member being initially pre-loaded against the brake element to hold it by static friction, means operated by any deflection of the driving means for regulating the loading on the brake in exact proportion to the torque imposed on the carrier by the material tension, means for operating the brake member to break down static friction, and feeler means operated by any deflection of the carrier mounting about its pivot for automatically controlling the amplitude of movement imparted by the operating means to the brake member, said feeler means being associated with the brake member operating means through a lost motion device to allow correct movement of the carrier.

10. Tension control means according to claim 9, characterized by the lost motion device comprising a pivoted member in the operating means for the brake member, said pivoted member having a triangular opening therein, an operating element for the brake member having a part in said opening, and means linking said part to the feeler means for it to be operated intermittently to permit controlled release of the carrier for rotation in steps of small amount.

11. Tension control means according to claim 9, charterized by the feeler means being pre-loaded for balancing the material tension to a predetermined degree, friction damper means for preventing said load imparting strain on the material under conditions of rest, and control means between the feeler and damper means for breaking down static friction in the damper and allowing the pre-loading to have proper effect.

12. Tension control means according to claim 9, wherein the pivotal carrier mounting is supported by a flexible blade and carries a guide roller at its head for the material to pass thereover from the carrier.

References Cited in the file of this patent

UNITED STATES PATENTS

| | | |
|---|---|---|
| 1,103,144 | Hunting | July 14, 1914 |
| 1,395,830 | Jones | Nov. 1, 1921 |
| 1,613,320 | Gillot | Jan. 4, 1927 |
| 1,703,884 | Hutchins | Mar. 5, 1929 |
| 1,889,266 | Shorter | Nov. 29, 1932 |

FOREIGN PATENTS

| | | |
|---|---|---|
| 322,912 | Great Britain | Dec. 19, 1929 |